United States Patent Office 3,175,913
Patented Mar. 30, 1965

3,175,913
METHOD OF PRESERVING AND RESTORING THE FRESHNESS OF CAKES
Forrest H. De Loach, Jr., 2736 N. Thompson Road NE., Atlanta 19, Ga., and Harmon B. Miller, 1095 W. Conway Drive, Atlanta, Ga.
No Drawing. Filed Apr. 2, 1964, Ser. No. 356,975
5 Claims. (Cl. 99—92)

The present invention relates to baking cakes and more particularly to a method of baking and packaging cakes to permit restoring freshness. This is a continuation-in-part of application Serial No. 190,239, filed April 26, 1962, now abandoned.

Cakes, pies, biscuits, crackers, cookies and pretzels are at their peak of palatability immediately after removing them from the oven and cooling them sufficiently to be eaten. When these products remain at room temperature for any substantial period of time thereafter, they become stale. It is well known, for example, that bread, rolls and soft cakes become stale in a matter of days.

This places a severe limitation upon the baking industry, particularly when the baked goods are to be packaged and transported to shops distant from the bakery where they might remain on the shelf for several days before being sold. Because of this, many bakers have labeled their packaged baked goods with the date of baking so that the consumer can be assured of fresh goods. Consumers will only buy fresh baked products, so that the baker must deliver goods to the storekeeper and remove those which he has not yet sold each day. The day old baked products represent a loss; they may sometimes be sold at lower than usual price, but otherwise must be converted to bread crumbs and the like. Consequently, there is a need for baked products in which the problems associated with the staling process are avoided.

The reason for the staling of bread was the subject of a detailed study of J. R. Katz in the Netherlands in the years between 1915 and 1925. He also investigated the ability of bread to be made somewhat more fresh again by mild heating or steaming in ovens. He found that when bread was kept at room temperature the starch changed its character; the change could be observed under a microscope and by differences in the swelling of starch in excess of water. The change in the character of the starch during staling was reversible, and it appeared that the starch returned to its original state when stale bread was heated to a temperature of at least 165° F. under conditions which prevented substantial loss of moisture. This heating returns the bread substantially to its original fresh state as it was immediately after baking.

Further investigation has shown that Katz's findings can be confirmed, that bread not only becomes stale at room temperature but also under normal refrigeration (32–45° F.), that bread may be kept fresh by immediate freezing at a temperature of −10 to +10° F. after the bread is baked and cooled to room temperature and that it also can be kept fresh in air tight containers at 165° F. or more. Of course, the ability to keep bread fresh by storing it at such elevated temperatures is of no practical significance although many homekeepers now do freeze bread while it is still fresh.

Further work based upon the investigation of Katz has developed the "Brown and Serve" rolls. Bread, rolls or other yeast-leavened products are partially baked at a temperature lower than normal but high enough to "set" the dough to a rigid mass. By only partially baking the bread dough, it is possible to retain 25 to 50% of the moisture normally lost in baking. The partially baked bread is wrapped in moisture-proof film and sold to the consumer and will keep at room temperature for three or four days (or longer under refrigeration).

When the consumer is ready to use the bread or rolls, he completes the baking operation. By doing so he browns the crust and changes the starch from the "stale" state to the "fresh" state. He also removes the excess moisture which remained after the partial pre-baking and reduces the moisture content to that normal for baked bread. As a result, the bread taken from the oven is as fresh and as palatable as if the entire baking operation had been accomplished at once rather than having been interrupted.

The same process cannot be used for cake. Cakes do not become rigid and hold their shape if only partially baked, but collapse to a doughy mass. Hence, the problem of providing the consumer with fresh cake has remained.

The difference between the behavior of bread and cakes is in part the consequence of the difference in composition between bread and cakes. The differences are illustrated in the following table in which parts are given by weight. The proportions are given for layer cakes. Pound cake and angel food cake are more acid and have a pH of 5.0–6.0.

|  | Bread | Lean Cake | Rich Cake |
| --- | --- | --- | --- |
| Flour | 100 | 100 | 100 |
| Sugar | 5–10 | 100–110 | 120–140 |
| Shortening | 2–4 | 10–40 | 40–60 |
| Eggs | 0–4 | 10–20 | 50–75 |
| pH | 5.0–5.5 | 6.8–7.4 | 6.5 or above |

The larger proportions of shortening gives the cakes a softer and lighter texture, but precludes the possibility of "partial baking."

In accordance with the present invention, it has been found possible to pre-process cakes of the rich formula described above so that freshness can be restored by the consumer by the use of conditions quite different from those employed for bread. Rich cakes are first baked in a moisture-impervious pan-liner which covers the bottom and sides of the cake. As soon as the cake is cooled, it is placed in a moisture-proof container and it will then remain fresh for at least a week at room temperature without deterioration other than the normal staling. When the cake is to be served, it is heated for about 7 minutes at 350° F. while in the pan-liner. The cake, still in the pan-liner, is removed from the oven, inverted and allowed to cool. When cooled, it is frosted at once and is ready to serve. It is as fresh as if it had been frosted when taken from the oven after original baking.

The process is not applicable to lean cakes which become tough and unpalatable on reheating. The cakes which are suitable are the rich cakes which, as noted above, have a pH of 6.5-plus and the following proportions of flour, sugar, shortening and eggs.

|  | Parts by weight |
| --- | --- |
| Flour | 100 |
| Sugar | 120–140 |
| Shortening | 40–60 |
| Eggs | 50–75 |

Of course, other conventional ingredients will be included where appropriate such as

|  | Parts by weight |
| --- | --- |
| Baking powder | 4 to 7 |
| Milk solids | 11 to 17 |
| Salt | 3 to 5 |
| Starch | .25 to 1.75 |
| Flavoring | 1 to — |
| Water | 95 to 150 |

The cake is initially baked substantially to completion, i.e., to at least about 95% completion, at an oven temperature of 300–400° F., preferably 325° to 340° F. for 20 to 35 minutes, more preferably 340° F. for 30 minutes. The baking takes place with the batter in a pan-liner.

The pan-liner is an essential element of the invention and should be impervious to moisture and also quite flexible. As the cake is baked, the liner clings to the sides of the cake, and it remains in contact with the cake if it shrinks during baking or subsequent cooling.

When the cake is removed from the oven after this first baking, it is allowed to cool. When the cake is cooled to room temperature, it is placed in a moisture-proof container. This may be a paperboard box wrapped in cellophane. Alternatively, the cake may be wrapped, while still in the pan liner, in a plastic film such as polyethylene or Saran. The cake is then ready for sale.

The storekeeper and the purchaser can keep the cake for at least a week. It may become slightly stale during that time, but can be restored to oven freshness. When the purchaser is ready to serve the cake, he removes the wrapping but not the liner and then he heats the cake in an oven preheated to 300° to 400° F. for 5 to 15 minutes, preferably 350° F. for seven minutes. The cake is inverted, allowed to cool thoroughly and then the liner is removed. Frosting is applied and the cake is ready to serve.

The following example illustrates the practice of the invention.

*Example*

The following ingredients were mixed to form a batter:

|  | Lb. | Oz. |
|---|---|---|
| Flour | 2 | 8 |
| Sugar | 3 | 6.5 |
| Shortening | 1 | 0 |
| Eggs | 1 | 8 |
| Non-fat Milk Solids | 0 | 4.5 |
| Salt | 0 | 1.5 |
| Sodium Bicarbonate | 0 | .75 |
| Sodium Pyrophosphate | 0 | .75 |
| Calcium Acid Phosphate | 0 | .75 |
| Calcium Lactate | 0 | .05 |
| Starch | 0 | .1 |
| Banana Flavoring | 0 | .5 |
| Glucono-Deltalactone | 0 | .3 |
| Adipic Acid | 0 | .9 |
| Propionates | 0 | .5 |
| Water | 2 | 10 |

The mixture was aerated by agitation to form a smooth batter which was then poured into 8-inch layer cake pans in which there were thin paper pan-liners. The filled pans were placed in an oven preheated to 340° F. and baked for 30 minutes. They were then removed, cooled thoroughly, and then wrapped in cellophane.

Five days later, the cakes were unwrapped and placed with the liner down in an oven preheated to 350° F. After seven minutes, the cakes were removed and inverted until cool. When thoroughly cool, the pan-liners were removed and butter cream frosting was applied. The cake was served and was as fresh, soft and fluffy as if it had been baked the same day.

It will be appreciated that various changes and modifications can be made without departing from the scope of the invention, as set forth in the claims.

1. A method of baking cakes and restoring the freshness of the cakes prior to serving which comprises preparing a batter which has a pH of at least 6.5 and in which the proportions of flour, sugar, shortening and eggs are about 100 parts by weight flour, about 120–140 parts by weight sugar, about 40–60 parts by weight shortening and about 50–75 parts by weight eggs, baking the batter to substantial completion while the bottom and sides of the cake are surrounded by a flexible pan-liner which is impervious to moisture, cooling the cake, packaging the cake in a moisture-retaining container, unpackaging the cake when it is to be served, reheating the cake with the pan-liner in place, inverting and cooling the reheated cake with the pan-liner overlying and surrounding the cake and removing the pan-liner.

2. A method of baking cakes and restoring the freshness of the cake prior to serving as set forth in claim 1 in which the first baking is carried out at a temperature of 300° F. to 400° F. for 20 to 35 minutes.

3. A method of baking cakes and restoring the freshness of the cake prior to serving as set forth in claim 1 in which the cake is reheated at 300° to 400° F. for 5 to 15 minutes.

4. A method of baking cakes to permit restoring the freshness of the cakes by reheating prior to serving, which comprises preparing a batter which has a pH of at least 6.5 and in which the proportions of flour, sugar, shortening and eggs are about 100 parts by weight flour, about 120–140 parts by weight sugar, about 40–60 parts by weight shortening and about 50–75 parts by weight eggs, baking the batter to substantially completion while the bottom and sides of the cake are surrounded by a flexible pan-liner which is impervious to moisture, and cooling the cake with the pan-liner surrounding the cake.

5. A method of baking cakes to permit restoring freshness prior to serving as set forth in claim 4 in which the cake is baked at a temperature of 300° to 400° F. for 20 to 35 minutes.

References Cited in the file of this patent
UNITED STATES PATENTS 2,649,379   Woods ------------------ Aug. 18, 1953